United States Patent
Leimbach et al.

(10) Patent No.: US 6,446,024 B1
(45) Date of Patent: Sep. 3, 2002

(54) PROCESS AND DEVICE FOR DETERMINING A VEHICLE'S MASS

(75) Inventors: Klaus-Dieter Leimbach, Möglingen; Hans Veil, Eberdingen; Stefan Hummel, Stuttgart, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/254,351

(22) PCT Filed: Jun. 17, 1998

(86) PCT No.: PCT/DE98/01641

§ 371 (c)(1),
(2), (4) Date: Mar. 5, 1999

(87) PCT Pub. No.: WO99/02947

PCT Pub. Date: Jan. 21, 1999

(30) Foreign Application Priority Data

Jul. 5, 1997 (DE) .......................... 197 28 769

(51) Int. Cl.$^7$ .......................... G01P 15/00; G06F 15/00
(52) U.S. Cl. .......................... 702/141; 73/118.1; 73/146
(58) Field of Search .......................... 702/141, 127, 702/142; 73/488, 503, 510, 514.01, 118.1, 146; 701/37, 38, 51, 67

(56) References Cited

U.S. PATENT DOCUMENTS

| | | | | |
|---|---|---|---|---|
| 4,416,360 A | * | 11/1983 | Fiala ............................ | 477/5 |
| 4,533,011 A | * | 8/1985 | Heidemeyer ............... | 180/65.2 |
| 4,941,365 A | * | 7/1990 | Reiner et al. .............. | 73/865 |
| 5,434,780 A | | 7/1995 | Masayuki et al. | |
| 5,549,364 A | * | 8/1996 | Mayr-Frohlich et al. ... | 303/9.69 |
| 5,755,302 A | * | 5/1998 | Lutz et al. ................ | 180/65.2 |
| 5,925,087 A | * | 7/1999 | Ohnishi et al. ............ | 701/70 |

FOREIGN PATENT DOCUMENTS

| | | | | |
|---|---|---|---|---|
| DE | 3843818 | | 5/1990 | |
| DE | 3843818 C1 | * | 5/1990 | .......... G01G/19/03 |
| DE | 4228413 | | 3/1994 | |
| EP | 0111636 | | 6/1984 | |

* cited by examiner

Primary Examiner—John S. Hilten
Assistant Examiner—Demetrius R. Pretlow
(74) Attorney, Agent, or Firm—Walter Otteson

(57) ABSTRACT

A mass value is determined which represents the mass of a vehicle. The vehicle includes a drive unit and a clutch unit. By the disengagement of the clutch unit, the force flow between the drive unit and the vehicle wheels can be essentially interrupted. At least a first acceleration value is detected which represents the vehicle acceleration at a first time point. Furthermore, at least a first drive value is detected which represents the drive force or the drive torque of the drive unit at the first time point. At least a second acceleration value is detected which represents the vehicle acceleration at a second time point whereat the clutch unit is disengaged. A comparison then takes place of the detected second acceleration value with at least one pregivable threshold value. The determination of the mass value takes place at least in dependence upon the comparison and at least in dependence upon the detected first acceleration value and the detected first drive value.

9 Claims, 4 Drawing Sheets

PROCESS AND DEVICE FOR DETERMINING A VEHICLE'S MASS

FIELD OF THE INVENTION

The invention relates to a method and an arrangement for determining a mass value representing the mass of a vehicle.

BACKGROUND OF THE INVENTION

The mass value represents the mass of a vehicle.

From the state of the art, systems for controlling (open loop and/or closed loop) the driving dynamics in motor vehicles are known. Here, the driving of the brake systems is of primary concern. In such systems, the knowledge of the vehicle mass with the greatest possible accuracy is of great importance.

If the motor vehicle is a commercial vehicle having a tractor vehicle and a trailer/wagon, then an optimal matching of the braking forces in the sense of economy, safety and driving comfort can be obtained when the masses of the tractor vehicle and the trailer/wagon are known with the greatest precision. If the mass of the entire entity is known, then, for a known mass of the tractor vehicle, the mass of the trailer/wagon can be determined. In commercial vehicles, large differences in the loading and therefore in the entire mass of the vehicle can occur. For this reason, the entire mass and the mass distribution between tractor vehicle and trailer/wagon must be always newly determined. Accordingly, the driving stability can be increased by a suitable distribution of the braking torques to the individual wheel brakes.

A determination of the total mass of a vehicle is known from German patent application DE 42 28 413. In this determination, the vehicle longitudinal acceleration and the corresponding drive forces are measured at two different sequential time points (close in time to each other) during an acceleration operation of the vehicle. The vehicle mass can be determined in dependence upon the measured quantities. Here, it is assumed that the traveling resistance during the mass determination does not significantly change, for example, because of a change of the inclination of the roadway.

SUMMARY OF THE INVENTION

The object of the present invention is to show a most precise and simple mass determination while considering a roadway.

ADVANTAGES OF THE INVENTION

As already mentioned, the invention relates to the determination of a mass value representing the mass of a vehicle and especially of a commercial vehicle. The vehicle includes a drive unit and a coupling unit. By opening the coupling unit, the force flow between the drive unit and the vehicle wheels can essentially be interrupted. According to the invention, at least a first acceleration value is detected which represents the vehicle acceleration at a first time point. At this first time point, the coupling unit is essentially closed. Furthermore, at least a first drive value is detected which represents the drive force or the drive torque of the drive unit at the first time point. The essence of the invention is that at least a second acceleration value is detected which represents the vehicle acceleration at a second time point at which the coupling unit is essentially open. Then, a comparison of the detected second acceleration value to at least one pre-given threshold value takes place. According to the invention, the determination of the mass value takes place at least in dependence upon the comparison and at least in dependence upon the detected first acceleration value and the detected first drive value.

With the comparison according to the invention, a roadway slope is detected, whereby a defective mass determination, which is caused by the roadway slope, is avoided without a further sensor being necessary for the determination of the mass and/or for the determination of the slope of the roadway. The mass can be determined during a single acceleration operation and the algorithm according to the invention is easily applied. Here, it has been shown that the result of the mass estimation, which is achieved with the invention, is adequately precise in practice.

It is especially advantageous that it is determined with respect to the comparison of the invention whether the detected second acceleration value lies within an interval. The acceleration values within this interval represent a travel on an essentially level roadway.

If in the comparison of the invention, it is determined that the detected second acceleration value lies outside of the interval, then the mass value is advantageously determined in dependence upon the detected second acceleration value especially in the sense of a correction caused by the inclination of the roadway. In this way, one obtains a generally preliminary mass value even for an inclined roadway with this mass value being burdened with an error under some circumstances.

To improve the mass determination, it is advantageous that at least a first and a second roadway resistance value are determined at least in dependence upon two detected first acceleration values and two detected first drive values at time points at which the clutch is engaged. One of the determined running resistance values is then applied to determine the mass value. It is especially provided that the mean value of at least two of the determined running resistance values is determined as mass value.

The specific running resistance values can be lowpass filtered to avoid unwanted signal fluctuations.

If, for the determination of the mass value or for the determination of the running resistance values, a value representing the vehicle speed and/or a value representing the rotational speed of the vehicle wheels is applied, then the influence of the air dynamic drag and/or the inertial torques of the vehicle wheels can be considered in the mass determination.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
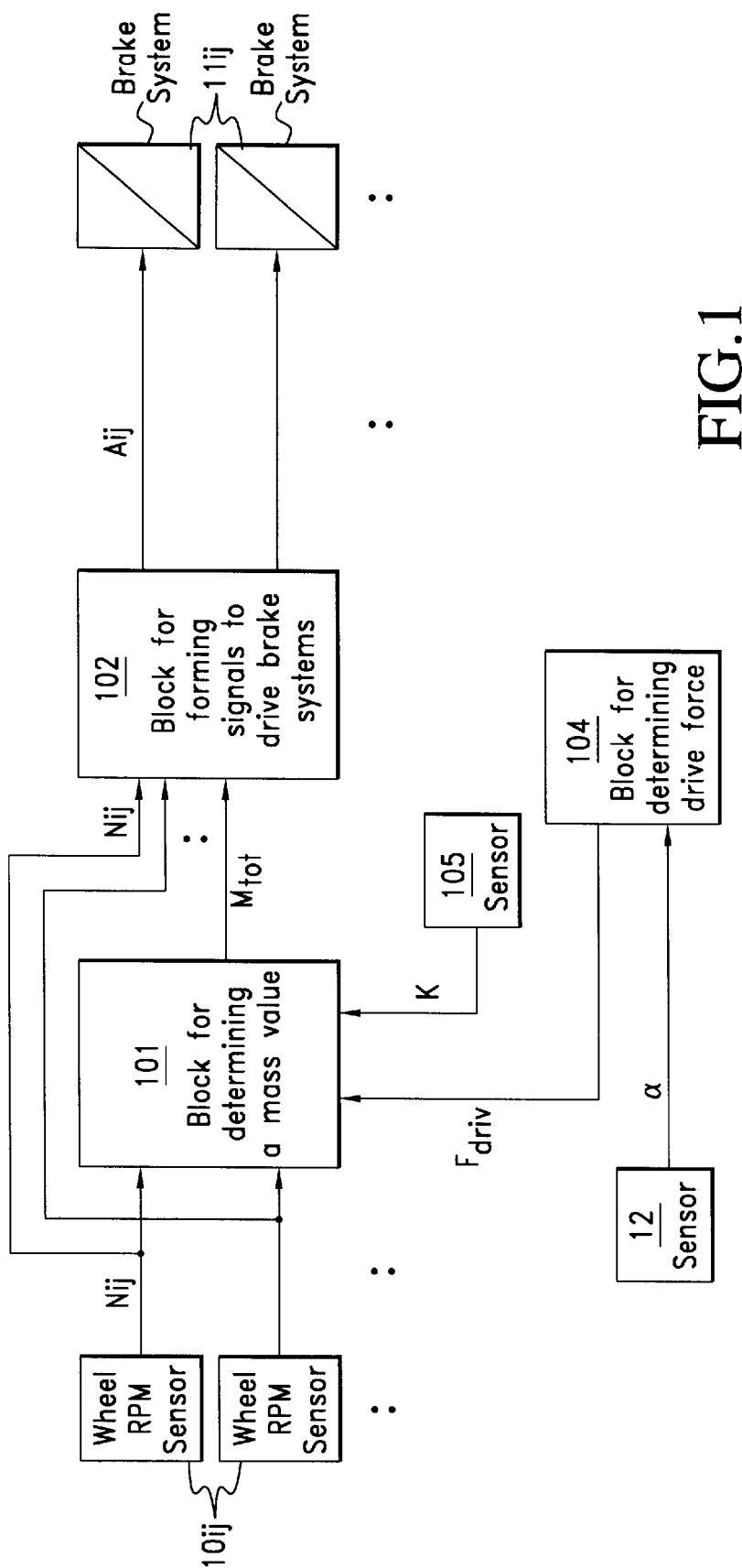
FIG. 1 shows an overview block circuit diagram of the invention; whereas, the block circuit diagram shown in FIG. 2 provides greater detail as to the embodiment.

FIG. 1 shows wheel rpm sensors with blocks $10ij$. The sensors detect the rotational speeds of the wheels. The wheel rpm signals Nij are supplied to block 101 which determines a mass value $M_{ges}$ representing the total mass of the vehicle and supplies this value to block 102. In block 102, the brake system 11ij and especially the individual wheel brake systems are driven by the drive signals Aij in dependence upon the entire mass $M_{ges}$, the wheel rpms Nij and, if required, in dependence upon additional signals.

To determine mass, the drive force $F_{driv}$ which is determined in block 104, or the drive torque is supplied to the block 101. Furthermore, a signal K is supplied to the block 101 which represents the operating state of the vehicle clutch which is arranged in the drive train together with the vehicle motor and the vehicle transmission.

Block 105 represents a sensor for detecting actuation of the clutch by the driver.

In the following, the mass determination 101 of the vehicle or the vehicle combination (tractor vehicle plus trailer or wagon) is described in greater detail.

The starting point for the determination of the mass $M_{tot}$ of a vehicle is the force balance or an energy balance in the longitudinal direction of the vehicle movement. For this purpose, operating phases are used in which braking torques and drive torques acting on the wheels are known.

In the following, the determination of the mass $M_{tot}$ for an acceleration $a_{vehl}$ of a vehicle is described. For an acceleration operation, the force balance is:

$$M_{tot} * a_{vehl} = F_{driv} - F_{roll} - F_{air} - F_{dow} - F_{rot} \quad (1)$$

wherein:

| | |
|---|---|
| $a_{vehl}$ | the vehicle acceleration |
| $F_{driv}$ | the drive force |
| $F_{roll}$ | the rolling resistance force |
| $F_{air}$ | the aerodynamic drag |
| $F_{down}$ | the downgrade force (gravity component) |
| $F_{rot}$ | the force for accelerating rotating masses (wheels, transmission, ...) |

Figure 2:
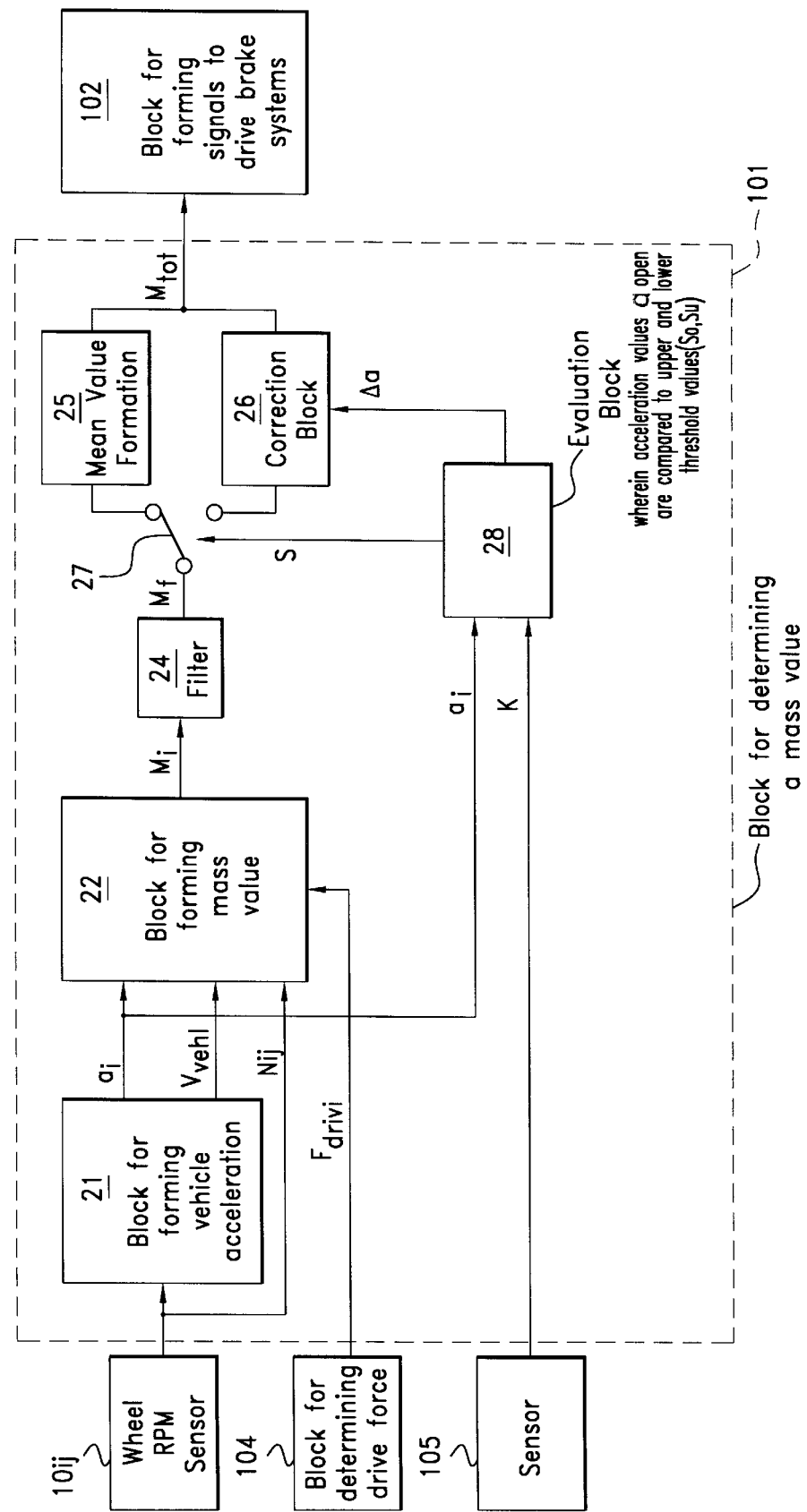

In FIG. 2, the actual vehicle acceleration $a_{vehl} = a_i$ at time point $t_i$ is determined in block 21 from the wheel rpms Nij in a manner known per se by forming differences. The formation of the actual drive force $F_{driv} = F_{drivi}$ at time point $t_i$ is determined in block 104, in general, in dependence upon the data present in the motor control apparatus. This will be described in the course of this embodiment.

The aerodynamic drag force $F_{air}$ can be determined in accordance with the equation:

$$F_{air} = \frac{1}{2} * C_w * \rho_{air} * A * v^2_{vehl} \quad (2)$$

wherein plausible approximation values are inserted for $c_w$ and $\rho_{air}$. The vehicle longitudinal speed $V_{vehl}$ is likewise formed in block 21 from the wheel rpms in a manner known per se.

The value $F_{rot}$ results from the measured wheel rpms $N_{wheel} = Nij$ and the total inertial torque of all wheels $J_{wheel}$:

$$F_{rot} = dN_{wheel}/dt * J_{wheel} * 1/r_{wheel} \quad (3)$$

For vehicle entities (tractor vehicle with trailer/wagon) with continuously changing trailers or wagons, a substitute value must be assumed as the inertial torque of the trailer/wagon.

The rolling resistance $F_{roll}$ is neglected in this embodiment.

On a level roadway, a value $M_i$, which represents the vehicle mass at time point $t_i$, can be determined pursuant to the equation:

$$M_i = (F_{drivi} - F_{airi} - F_{roti})/a_i \quad (4)$$

with the values $F_{drivi}$, $a_i$, $F_{roti}$ and $F_{airi}$ which are actual values at time point $t_i$. This takes place, at first independently of the roadway slope, in block 22. In block 24, the mass value $M_i$, which is determined in this way, is lowpass filtered to a filtered mass value $M_f$.

If the vehicle travels a roadway (uphill or downhill) sloped in the driving direction, then equation (4) (as well as any other physical balance equation) leads to a significant estimation error because the running resistance changes considerably because of the slope. In the case of an inclined roadway, the mass value $M_i$, which is determined in accordance with equation (4), includes a considerable running resistance component.

For this reason, a method is necessary which considers the running resistance change effected thereby for a slope which is too great and discards or corrects the computed mass estimation value. According to the invention, starting operations or acceleration phases of the vehicle are used for determining the vehicle mass.

In block 28, which is shown in FIG. 2, the acceleration $a_i = a_{open}$ is evaluated at the time points $t_i$ at which the clutch of the vehicle is essentially disengaged with the acceleration $a_i$ being determined in block 21. Such a disengagement of the clutch takes place during the starting operations, in general to interrupt the force flow between motor and transmission during shifting operations of the gear ratios in the vehicle transmission. The time points at which the clutch is disengaged are determined by the signal K which, for example, represents a clutch actuation (block 105) of the driver.

In block 28, a check is made as to whether the acceleration values $a_{open}$ (detected during the disengagement of the clutch) lie within a pregiven region. This region contains the acceleration values which the vehicle would have attained for a force flow interruption without a significant inclination of the roadway. This can take place in that the acceleration values $a_{open}$ are compared to an upper threshold value So and a lower threshold value Su.

If the values $a_{open}$ lie within the region (travel without significant roadway slope), then the switch 27 is brought into the position shown in FIG. 2 by the signal S. In block 25, the total mass $M_{tot}$ is determined by a mean value formation of the values $M_f$.

If the values $a_{open}$ lie outside of the region (travel on a roadway sloped in travel direction), then the switch 27 is driven by the signal S so that the mean value of the values $M_f$ is corrected by the value of the roadway slope in block 26. For this purpose, the deviation $\Delta a$ ($=a_{open} - a_{plane}$) of the value $a_{open}$ from a value $a_{plane}$ is supplied to the block 26. The value $a_{plane}$ represents the acceleration during a drive in the plane for an open clutch.

Accordingly, an acceleration is measured when the clutch is disengaged. For decelerations, which correspond to the driving resistance without slope, a conclusion is drawn as to a level roadway and the mass estimate 25 is permitted in the plane. At higher or lower decelerations, the vehicle is on a slope. In this case, the acceleration is corrected (block 26) during the drive phase by the value of the upgrade.

Figure 4:
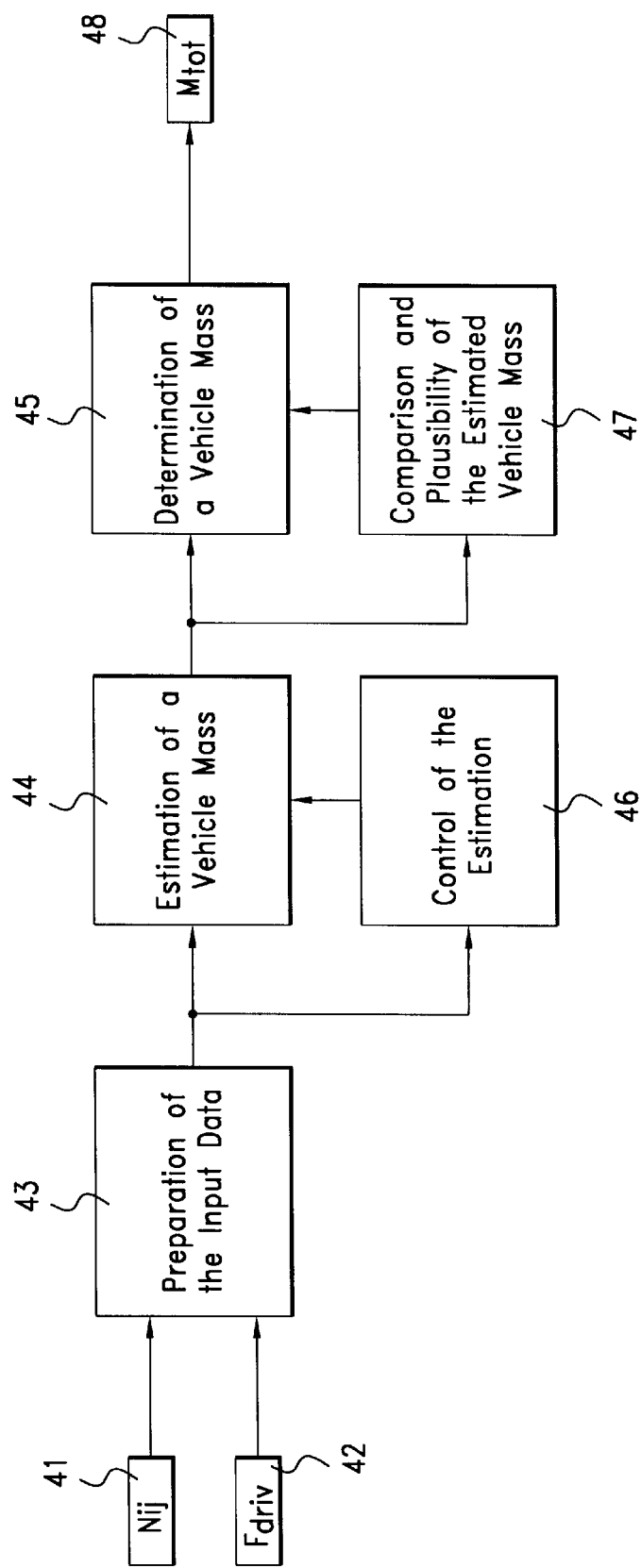
FIG. 4 shows the sequence according to the invention.

FIG. 4 shows the sequence of the procedure in block 101. After the preparation 43 of the input data Nij 41 and $F_{drivi}$ 42, a vehicle mass is estimated (equation 4, block 44) during an acceleration phase. The downhill output is, at first, neglected. The control 46 of the estimate then, for example, ensures that only adequately high acceleration states are applied for mass formation. The estimate or computation of the mass is only permitted within specific threshold values (plausibility check). Thus, for example, a minimum positive driving acceleration and a minimum drive force must be present (function block 46 "control of the estimate"). At the output of block 44, a computed vehicle mass is thereby present.

In a further step 47, the acceleration operation is checked as to whether the vehicle was in the plane or must be corrected (block 45) by the factor slope influence (gravity component). For this purpose, and as described, the acceleration values are evaluated which had been detected during the disengagement of the clutch. Furthermore, the mass which is determined in block 44, is checked while considering already determined state quantities such as charge change and then the actual vehicle mass (block 48) is outputted or confirmed. A final mass value is determined by the computation of several values and subsequent averaging. An interval is formed about the final mass value in order to check newly computed values as to plausibility.

Figure 3:
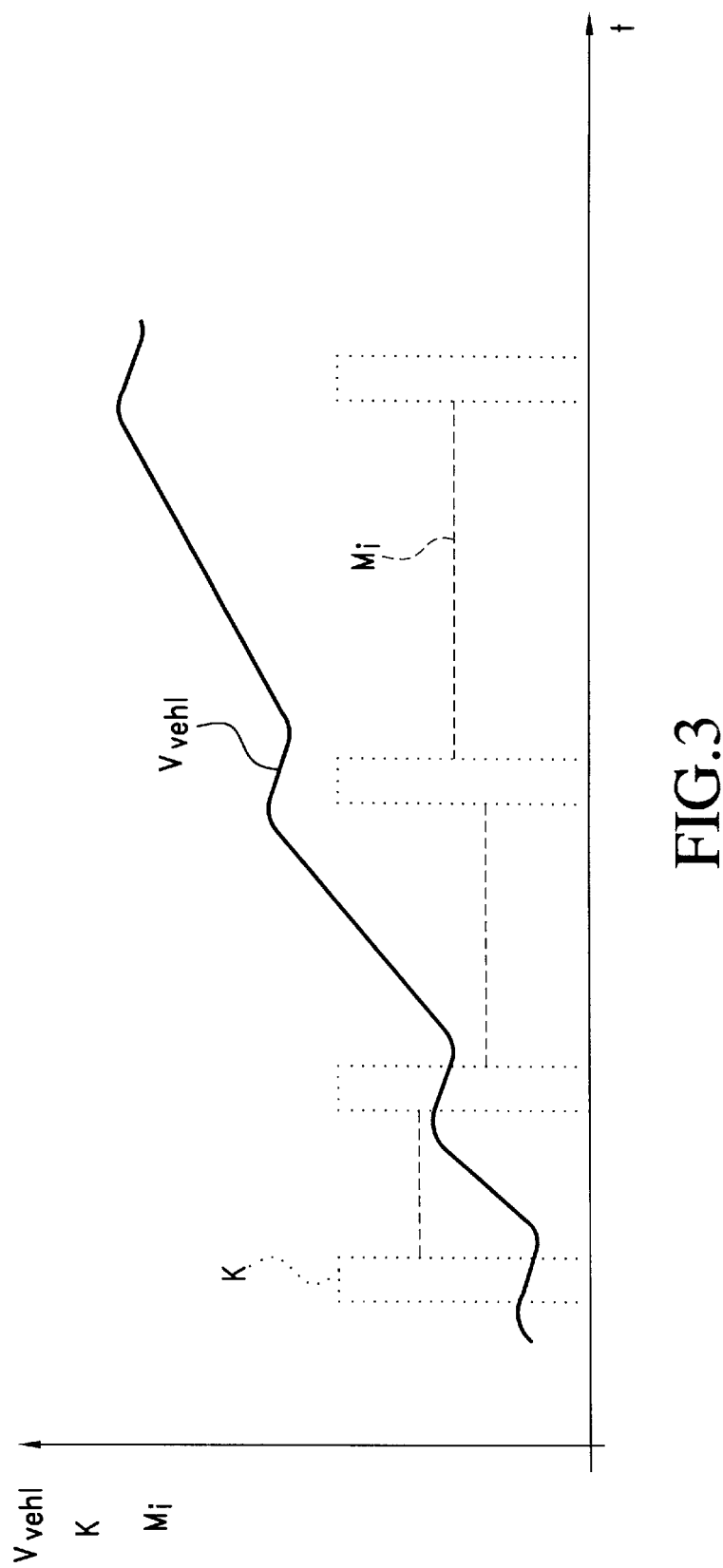
In FIG. 3, the time-dependent traces of the running resistance or mass values, road speed as well as the clutch actuation are shown.

FIG. 3 schematically shows the time-dependent trace of the driving resistance or mass values $M_i$. the vehicle speed $V_{vehl}$ during a starting operation. During the starting operation, the clutch is disengaged for the transmission shift operations. This can be seen in FIG. 3 with the trace K. During disengagement of the clutch, the road speed generally drops for a short time. During the time the individual transmission gears are engaged, the vehicle accelerates whereupon different vehicle masses or driving resistances $M_i$ are determined in block 22 (FIG. 2) depending upon the slope of the roadway traveled.

Here it should be mentioned that the function of block 22 is not limited to the above-mentioned equation (4). Any other estimation method can be used in block 22.

In the following, the determination of the drive force $F_{drivi}$ in block 104 is discussed. The drive force $F_{driv}$ which is necessary for the estimate, can be computed from the motor torque, which is made available by the motor control, while considering the gear ratio as well as the losses in the motor and transmission as follows:

The motor torque $M_{mot\_EDC}$, which is outputted by the motor control EDC, is made up of the drive torque $M_{mot\_driv}$ a motor loss torque $M_{mot\_loss}$ and a vehicle loss torque $M_{vehl\_loss}$.

$$M_{mot\_EDC}=M_{mot\_driv}+M_{mot\_loss}+M_{vehl\_loss} \quad (5)$$

wherein:

$M_{mot\_driv}$ is the drive torque acting on the transmission input. $M_{vehl\_loss}$ is the component which is made up of the motor friction losses $M_{mot\_fric}$ and the motor acceleration losses $M_{mot\_\theta}$ (inclusive of the clutch).

$$M_{mot\_loss}=M_{mot\_fric}+M_{mot\_\theta} \quad (6)$$

The motor losses $M_{mot\_loss}$ can be described by friction losses $M_{mot\_fric}$ and losses because of the acceleration of the motor $F_{mot\_\theta}$. The friction losses of the motor are a function of the motor rpm $n_{mot}$ and the water temperature $t_{water}$.

$$M_{mot\_fric}=f(n_{mot}, t_{water}) \quad (7)$$

The losses, which arise because of the acceleration of the motor ($M_{mot\_\theta}$), result from the motor rpm acceleration and an inertial torque $J_{mot}$ which contains the motor as well as parts of the drive train.

$$M_{mot\_\theta}=(f(dn_{mot}))/dt=d\omega_{mot}/dt*J_{mot} \quad (8)$$

While considering the above-listed losses, a torque can be computed from the motor drive torque with the aid of the total transmission ratio $i_{tot}$ (transmission, differential, ...). This torque acts on the drive wheels.

$$M_{driv}=(M_{mot\_driv}*\eta_{tran})/i_{tot} \quad (9)$$

Here, ηtrancorresponds to the torque loss in transmission and differential.

The entire transmission ratio is determined from the ratio of motor rpm $n_{mot}$ to the wheel rpm of the driven wheels $n_{wheel}$.

$$I_{tot}=n_{mot}/n_{wheel} \quad (10)$$

From the torque, which acts on the drive wheels, the drive force $F_{driv}$ is determined via the wheel radius $r_{wheel}$.

$$F_{driv}=M_{driv}/r_{wheel} \quad (11)$$

If it is recognized during the acceleration phase that other quantities influence the drive force, then the estimation of mass is interrupted.

An improvement of the estimation of mass can take place via the consideration of operating states in which the vehicle is in. For example, if, during a starting operation, an excessive drive slippage is present so that, for example, a drive slip control comes into use, then this starting operation should not be used for determining the mass.

Furthermore, it is advantageous to consider a value for the vehicle mass which is already present. A measured value for the axle load (ALB value) can be applied as such a start value. In this way, the mass determination according to the invention can be optimized.

The invention has essentially the following advantages:
no further sensor is necessary for the determination of the mass;
the vehicle mass is determined during a single acceleration operation;
the algorithm of the invention is easily applicable; and,
the mass estimation, which is achieved according to the invention, is adequately precise in practice.

What is claimed is:

1. A method for determining a mass value ($M_{tot}$) of a motor vehicle having a drive unit and a clutch unit, the mass value ($M_{mot}$) representing the mass of a motor vehicle such as a recreational or commercial motor vehicle, the force flow between the drive unit and the vehicle wheels being interruptible by disengaging the clutch unit, the method comprising the steps of:

detecting at least one first acceleration value ($a_1$) which represents the vehicle acceleration at a first time point at which the clutch unit is engaged;

detecting at least a first drive value ($F_{driv1}$) which represents the drive force or the drive torque of the drive unit at the first time point;

detecting at least a second acceleration value ($a_{open}$) which represents the vehicle acceleration at a second time point at which the clutch unit is disengaged;

comparing the detected second acceleration value ($a_{open}$) to at least one pregiven threshold value (Su, So);

detecting a roadway slope from the comparison of said second acceleration value ($a_{open}$) to said at least one pregiven threshold value (Su, So); and, determining the mass value ($M_{tot}$) at least in dependence upon said roadway slope and at least in dependence upon the detected first acceleration value ($a_1$) and the detected first drive value ($f_{driv1}$).

2. The method of claim 1, for the comparison, the method comprising the further step of determining whether the detected second acceleration value ($a_{open}$) lies within an interval (Su, So) with the acceleration values within said interval representing a travel on a plane roadway.

3. The method of claim 1, when determining that the detected second acceleration value ($a_{open}$) lies outside of the interval (Su, So), the method comprising the further step of determining the mass value ($M_{tot}$) in dependence upon the detected second acceleration value ($a_{open}$) in the sense of a correction caused by the roadway slope.

4. A method for determining a mass value ($M_{tot}$) of a motor vehicle having a drive unit and a clutch unit, the mass value ($M_{tot}$) representing the mass of a motor vehicle such as a recreational or commercial motor vehicle, the force flow between the drive unit and the vehicle wheels being interruptible by disengaging the clutch unit, the method comprising the steps of:

detecting at least one first acceleration value ($a_1$) which represents the vehicle acceleration at a first time point at which the clutch unit is engaged;

detecting at least a first drive value ($F_{driv1}$) which represents the drive force or the drive torque of the drive unit at the first time point;

detecting at least a second acceleration value ($a_{open}$) which represents the vehicle acceleration at a second time point at which the clutch unit is disengaged;

comparing the detected second acceleration value ($a_{open}$) to at least one pregiven threshold value (Su, So);

determining the mass value ($M_{tot}$) at least in dependence upon the comparison and at least in dependence upon the detected first acceleration value ($a_1$) and the detected first drive value ($f_{driv1}$); and, determining at least a first and a second running resistance value ($M_1$, $M_2$) at least in dependence upon two detected first acceleration values ($a_1$, $a_2$) and two detected first drive values ($F_{driv1}$, $F_{driv2}$).

5. The method of claim 4, the method comprising the further step of applying at least one of the determined running resistance values ($M_1$, $M_2$) to determine the mass value ($M_{tot}$) wherein the mean value is determined as mass value ($M_{tot}$) from at least two of the determined running resistance values ($M_1$, $M_2$).

6. The method of claim 4, the method comprising the further step of lowpass filtering the determined running resistance values ($M_1$, $M_2$).

7. The method of claim 4, wherein the determination of the mass value ($M_{tot}$) or for determining the running resistance values ($M_1$, $M_2$) a value ($V_{vehl}$), which represents the road speed, and/or a value ($V_{wheel}$), which represents the rotational speed of the wheels of the vehicle, is applied.

8. An arrangement for determining a mass value ($M_{tot}$), which represents the vehicle mass, for a vehicle having a drive unit and a clutch unit wherein the force flow between the drive unit and the vehicle wheels can be interrupted by disengaging the clutch unit, the arrangement comprising:

first detecting means for detecting at least a first acceleration value ($a_1$), which represents the vehicle acceleration at a first time point, when the clutch unit is engaged and for detecting at least a second acceleration value ($a_{open}$), which represents the vehicle acceleration at a second time point, when the clutch unit is disengaged;

second detecting means for detecting at least a first drive value ($F_{driv1}$), which represents the drive force or the drive torque of the drive unit at the first time point;

comparison means for comparing the detected second acceleration value ($a_{open}$) to at least one pregivable threshold value (Su, So);

means for detecting a roadway slope from the comparison of said second acceleration value ($a_{open}$) to said at least one pregivable threshold value (Su, So); and, means for determining the mass value ($M_{tot}$) at least in dependence upon said roadway slope and at least in dependence upon the detected first acceleration value ($a_1$) and the detected first drive value ($F_{driv1}$).

9. An arrangement for determining a mass value ($M_{tot}$), which represents the vehicle mass, for a vehicle having a drive unit and a clutch unit wherein the force flow between the drive unit and the vehicle wheels can be interrupted by disengaging the clutch unit, the arrangement comprising:

first detecting means for detecting at least a first acceleration value ($a_1$), which represents the vehicle acceleration at a first time point, when the clutch unit is engaged and for detecting at least a second acceleration value ($a_{open}$), which represents the vehicle acceleration at a second time point, when the clutch unit is disengaged;

second detecting means for detecting at least a first drive value ($F_{driv1}$), which represents the drive force or the drive torque of the drive unit at the first time point;

comparison means for comparing the detected second acceleration value ($a_{open}$) to at least one pregivable threshold value (Su, So);

means for determining the mass value ($M_{tot}$) at least in dependence upon the comparison and at least in dependence upon the detected first acceleration value ($a_1$) and the detected first drive value ($F_{driv1}$); and, wherein a determination is made by means of the comparison means as to whether the detected second acceleration value ($a_{open}$) lies within an interval (Su, So); wherein acceleration values within this interval represent a drive on a roadway which is level; wherein it is provided that, when it is determined that the detected second acceleration value ($a_{open}$) lies outside of the interval (Su, So), the mass value ($M_{tot}$) is determined in dependence upon the detected second acceleration value ($a_{open}$) in the sense of a correction caused by the slope of the roadway.

* * * * *